G. W. WILSON.
Stalk-Chopper.
No. 51,507.
Patented Dec. 12, 1865.
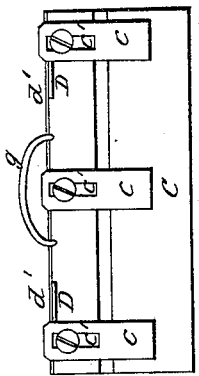
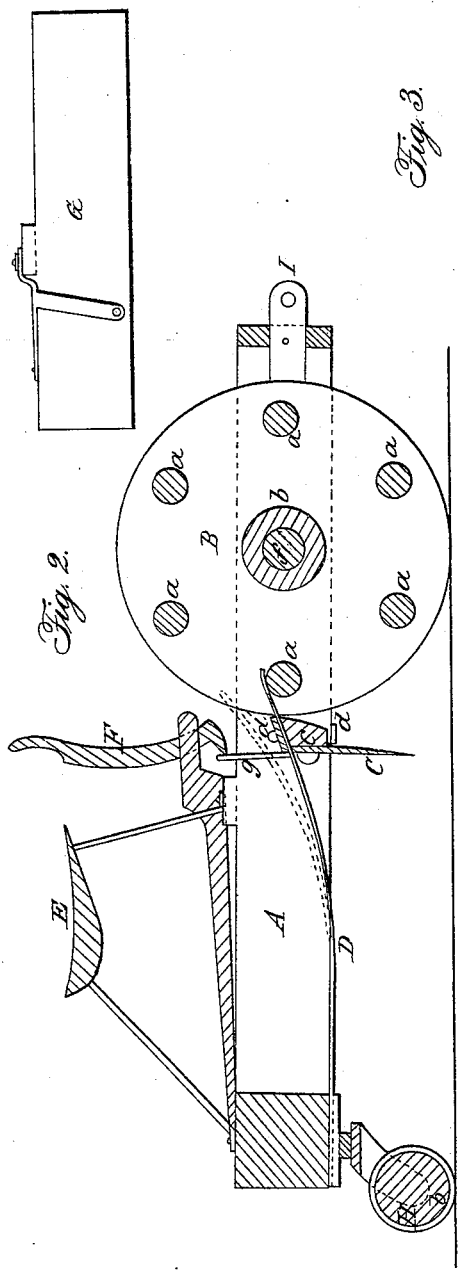
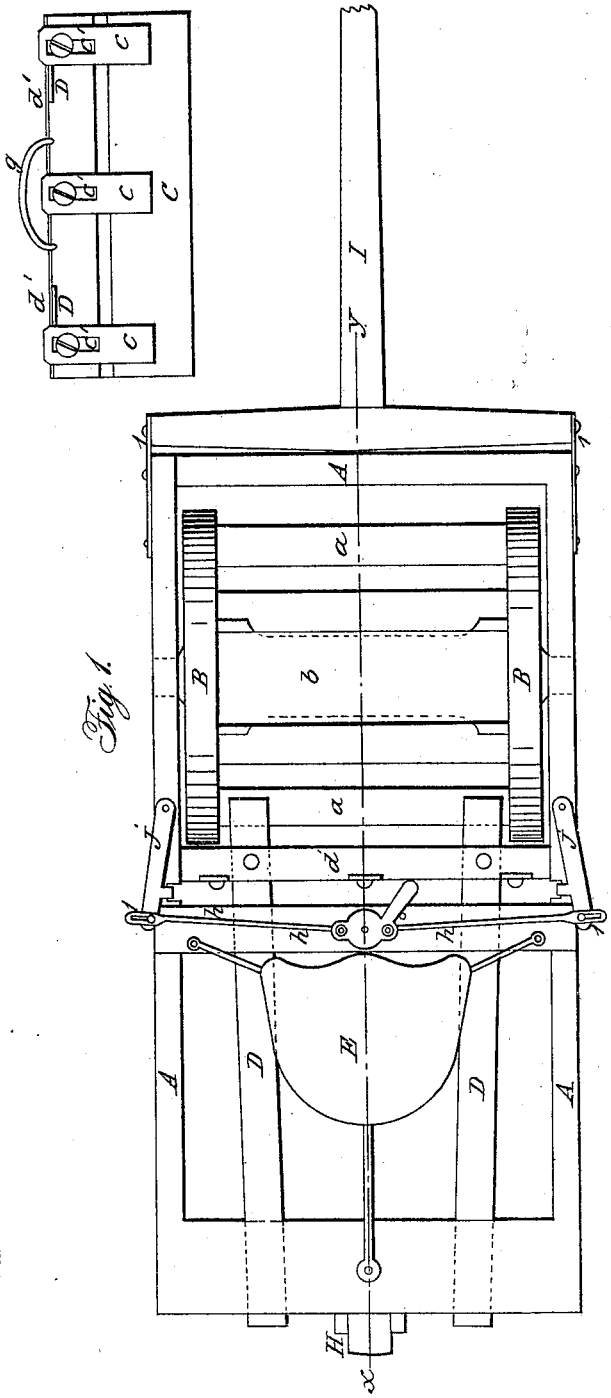
Witnesses:
Inventor:
George W. Wilson

UNITED STATES PATENT OFFICE.

GEORGE W. WILSON, OF GALESBURG, ILLINOIS.

IMPROVEMENT IN MACHINES FOR CUTTING STALKS AND STUBBLE IN THE FIELD PREPARATORY TO PLOWING.

Specification forming part of Letters Patent No. 51,507, dated December 12, 1865.

*To all whom it may concern:*

Be it known that I, GEORGE W. WILSON, of the city of Galesburg, in the county of Knox and State of Illinois, have invented a new and useful Improvement in Cornstalk-Cutters; and I do hereby declare the following to be a full, clear, and exact description of the construction and operation of the same, reference being had to the accompanying drawings, making a part of this specification, in which—

Figure 1 is a plan or top view of my improved cornstalk-cutter; Fig. 2, a longitudinal section of same, as indicated by the line $xy$ in Fig. 1; Fig. 3, transverse view of cutting-knife, showing the manner of adjusting the same by means of slotted pieces or bars attached to it, and to a transverse bar and screws, all of which and the above figures will be more particularly illustrated hereinafter.

Like letters in all figures of the drawings indicate like parts.

The nature of my improvement consists in the attachment of two or more elongated springs to the rear end of a longitudinal frame, constituting a part of my cornstalk-cutting machine, with a cutting-knife attached transversely to the springs, the said knife being so arranged that it may be adjusted in its relative position to the ground or to the stalks or stubble projecting therefrom when the machine is traversing the same, the knife being operated by what may be termed partially a "drum-wheel" having a series of rollers, so that every revolution the wheels of the drum make the knife is lifted and dropped; also, in the arrangement of a small lever or other similar mechanical device near the driver's seat for holding the knife up when desired, and thus disengage the same from the rollers, and thereby enable the machine to be transported about over the field or other place.

To enable others skilled in the art to make and use my invention, I will proceed to describe its construction and operation.

I construct a longitudinal frame, A, of the proper size. (See Figs. 1 and 2.) At the forward end of the frame are two solid wheels, B B, having a series of rollers, $a\ a$, (see Fig. 2,) arranged equidistant around and near the periphery of the wheel. An axle or shaft, $b$, passes through the center of the wheels and is rigidly secured and fastened thereto. A sufficient portion of the axle projects beyond the wheels and through the sides of the frame, and when the machine is in motion revolves easily therein. The whole, thus constructed and arranged, forms what might be termed partially a "drum-wheel," and which supports the main body of the frame. The wheels not only perform the function of transporting the machine over the field, but, at the same time perform another function—the rollers in their connection, as above described with the wheels, serve to operate the cutting-knife C in the rear, which operation I will proceed to describe. Two elongated or other similarly-constructed steel springs, D D, are attached to the under rear end of the frame, and made secure and fast by suitable plates $d\ d$, screwed or bolted on over them. (See Fig. 2.) Near the front or forward end of the springs the cutting-knife is transversely attached. Three metallic bars, $c$, are secured in a permanent manner at their lower ends to the knife. (See Fig. 3.) The upper ends are attached to a cross-bar, either of metal or wood, with slots $c'$ in them, and screws to allow the knife to be adjusted when desired. The springs extend a little beyond the knife, (see Fig. 2,) so that every revolution the wheels make in traversing the field the knife is lifted by a roller and then dropped, the next succeeding roller catching and taking the ends of the springs up, carrying with them the knife, until the said roller is withdrawn, and so on in an alternate manner, each and every roller lifting and dropping the knife. The rollers are so constructed as to revolve easily, and thus relieve the friction as much as possible when coming in contact with the springs, as well as running easily over the ground.

It will thus be seen as the rollers press down or crush the stalks or stubble flatly the elasticity and power of the springs impel the knife down with such force when withdrawn from the rollers as to quickly cut the stalks close off to the ground; and, moreover, if the surface of the latter is irregular or any obstruction is met with the tendency of the knife will be to glide over it easily without difficulty from the nature and manner in which the springs are attached to the machine.

The knife is stopped in its descent from the rollers from going too much below the line of the wheels by cleats or pieces $d'$ $d'$ screwed onto the outside of the frame, which turn over on the under side to the inner, where, projecting sufficiently, catches the projecting ends of a metallic plate, $d''$, screwed onto the knife-bar over the springs to hold the latter, which cleats or pieces stop the metallic plate and thereby prevent the knife from going any farther.

When the machine is not in operation, or otherwise, the knife is thrown out of gear or disengaged from the rollers by the driver or operator in his seat E simply taking hold of a lever, F, in front of him and pressing it forward, the hooked end of it catching into a hook, $g$, attached to the knife-bar. (See Figs. 2 and 3.) The lever works in a slot in a bar, $g'$, fastened at one end to the rear of the frame and to a cross-bar, to which the seat is partially attached.

An equivalent mechanical contrivance is shown in Fig. 2 for holding or disengaging the knife, and will answer the purpose as well as the lever. An end view of it may be seen at the letter G. It is simply two rods, $h\ h$, attached to a plate working on a center, and secured to a cross-bar, as herein referred to, the ends of the rods having slots, in which a pivoted movable bar, $jj$, operates. Connecting with the same is a small lip projection projecting downward, which catches the knife and holds it the same as the other, when the center plate is turned one side by the driver placing his foot on a projection from it.

As hereinbefore described, the knife may be adjusted in being depressed or elevated by the slotted bars to which it is attached, according to the requirements of the occasion in the use of it.

To balance the frame or the machine, a caster-roller H is attached to the rear end of the same. I is the tongue at the forward end.

Having thus described my invention fully, what I claim therein as new, and desire to secure by Letters Patent, is—

1. The lifting and dropping of the knife C alternately by means of a series of rollers, $a\ a$, and the elongated or other similarly-constructed springs, D D, substantially in the manner and for the purpose as herein set forth.

2. The arrangement of the lever F and hook $g$, in combination with the rollers $a\ a$, for throwing out of gear or disengaging the springs to which the knife C is attached from the rollers, substantially in the manner and for the purposes as herein set forth.

GEORGE W. WILSON.

Witnesses:
O. F. PRICE,
JNO. C. STEWART.